United States Patent [19]

Huang

[11] Patent Number: 4,966,035
[45] Date of Patent: Oct. 30, 1990

[54] TIRE PRESSURE GAUGE

[76] Inventor: Tien-Tsai Huang, No. 4, Lane 30, Wu-Chang St., Pan-Chiao City, Taiwan

[21] Appl. No.: 470,151
[22] Filed: Jan. 25, 1990
[51] Int. Cl.⁵ .................... B60C 23/02; G01L 7/16
[52] U.S. Cl. ................................ 73/146.8; 73/744; 116/34 R
[58] Field of Search ............... 73/146.8, 744, 146.3; 116/34 R

[56] References Cited

U.S. PATENT DOCUMENTS 3,670,688  6/1972  Seaberg ........................... 73/146.8
4,768,460  9/1988  Soon-Fu ......................... 116/34 R
4,873,864  10/1989 Huang ............................ 73/146.8

Primary Examiner—Donald O. Woodiel

[57] ABSTRACT

A pen-like pressure gauge has an elongated outer casing with a chuck, having a first portion accommodating a transparent inner casing and a second portion accommodating a piston member which is in sliding and sealing contact with the inner surface of the metallic outer casing and which is connected to a scale member extending into the inner casing. The graduation marks of the scale member can be viewed from a window of the outer casing through the transparent inner casing.

3 Claims, 3 Drawing Sheets

TIRE PRESSURE GAUGE

BACKGROUND OF THE INVENTION

This invention relates to a tire pressure gauge and particularly to a pressure gauge which is attached to an inflating valve of a tire only at the time of measuring the pressure in the tire.

The pressure gauge of the above-mentioned type is known in the art. U.S. patent application No. 07/216,373 which is owned by the applicant of this application discloses a pressure gauge shown in FIG. 1 which has has an outer casing D with a window and a transparent inner casing C, the inner casing confining a pressure chamber and accommodating a pressure responsive piston member B which carries a scale member A that can be viewed through the window of the outer casing and the transparent casing. The defects found in this pressure gauge are that: the device is most likely to create inaccurate results since the pressure in the pressure chamber is liable to leak through the sealed joints of the outer and inner casings; and the piston is subjected to much friction when sliding along the inner surface of the inner casing which is made of plastic.

U.S. Pat. No. 4,768,460 discloses a pen-like pressure gauge which includes an outer casing accommodating a tubular piston member which is integrally connected with a tubular scale member and in which the spring which urges the piston member must endure considerable force created by the weights of the piston and the scale member and thus is liable to be fatigued. Additional elements are provided in this pressure gauge to adjust the force of the spring in case of fatigue failure of the spring. This construction is rather complicated.

SUMMARY OF THE PRESENT INVENTION

An object of the present invention is to provide an improved pressure gauge which is simple and which can overcome the disadvantages inherent with the above-mentioned pressure gauges.

According to the present invention, a pressure gauge includes: an elongated outer casing having a first end, an opposite second end, a first accommodating portion adjacent to the first end, a second accommodating portion adjacent to the second end, and a window adjacent to the first accommodating portion, the second end having an air inlet port; a chuck connected to the second end of the outer casing; a check valve provided in the air inlet port; a transparent inner casing fixed in the first accommodating portion; a piston member provided movably in the second accommodating portion and sealingly contacting the inner surface of the outer casing; an elongated scale member movably disposed in the inner casing and having one end connected to the piston member; and a spring member provided in the second accommodating portion and biasing the piston member away from the first accommodating portion. Preferably, the scale member is in the form of an elongated hollow member having a C-shaped cross-section.

In one aspect of the present invention, the pressure gauge further includes an adjustable connector to connect the scale member and the piston member. The connector includes an adjustment screw attached to the piston member and the scale member.

The exemplary preferred embodiment will be described in detail with reference to the accompanying drawings, in which:

DETAILED DESCRIPTION OF THE PREFERRED EMBODIMENT

Figure 1:
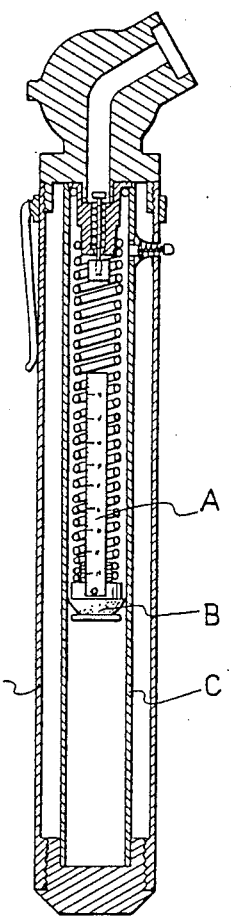
FIG. 1 is a sectional view of a pressure gauge in the prior art.
Figure 2:
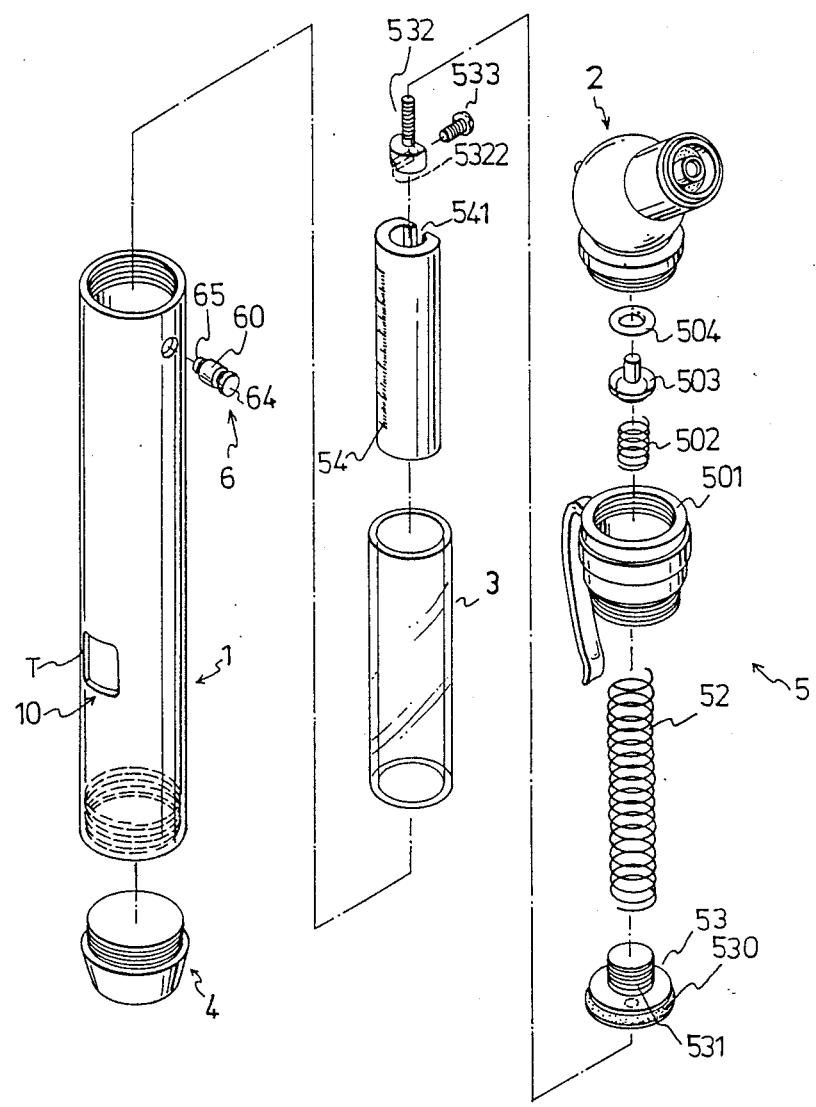
FIG. 2 is an exploded view of a pressure gauge according to the present invention.
Figure 3:
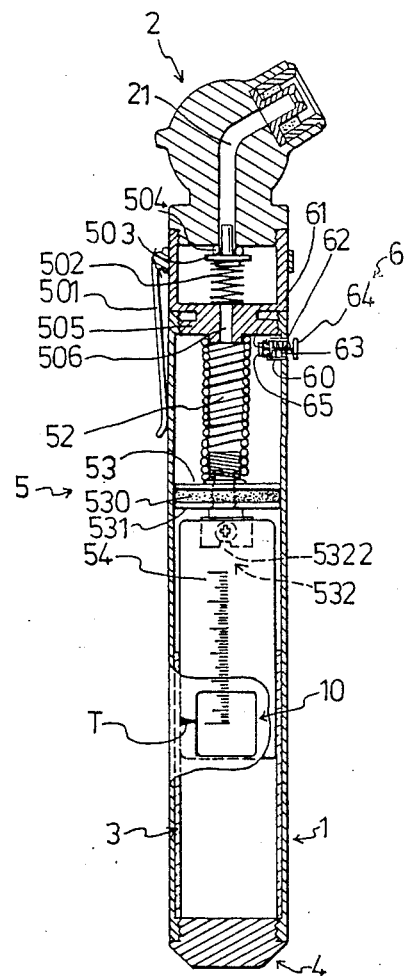
FIG. 3 is a sectional view of the pressure gauge of FIG. 2 in a normal position.
Figure 4:
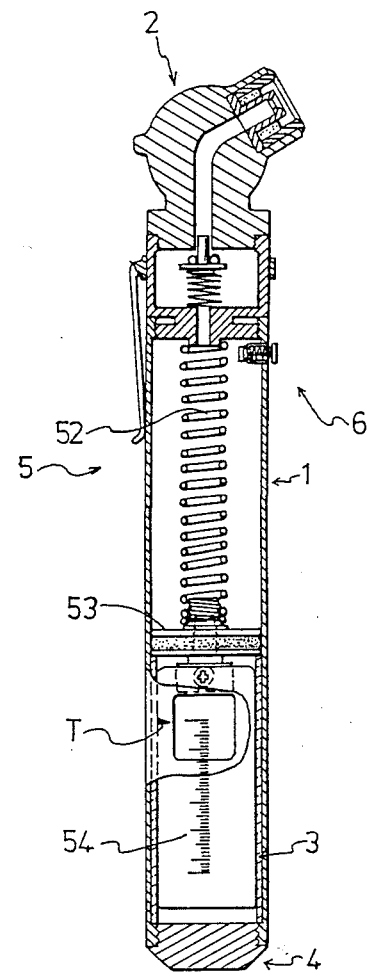
FIG. 4 is a sectional view of the pressure gauge of FIG. 2 in use.

Referring to FIGS. 1 to 3, a pressure gauge according to the present invention includes an elongated outer casing 1 having a window 10, a chuck 2, a cap 4, an elongated transparent inner casing 3 provided in the outer casing 1, a pressure measuring mechanism 5, and a pressure release valve 6.

A tubular connector 501 which has a closed end 505 is fixed to one end of the outer casing 1 as well as connected to the chuck 2. The closed end 505 is provided with an air inlet 506 which intercommunicates an air passage 21 of the chuck 2 and the interior of the outer casing 1. The passage 21 is closed by a check valve plug 503 with a sealing member 504 and a loading spring 502 which are provided in the chamber formed between the closed end 505 and the chuck 2.

The transparent inner casing 3 is fitted in a first portion of the outer casing adjacent to the window 10. A magnifying glass 101 is provided in the window 10. An indicating mark T is provided on the outside side of the outer casing 1 adjacent to the window 10.

The pressure measuring mechanism 5 includes a piston member 53 which is disposed in a second portion of the outer casing between the first portion and the closed end 505 of the tubular connector 501. An extension spring 52 is connected to a projection 531 of the piston 53 as well as to the closed end 505 so as to pull the piston 53 away from the transparent inner casing 3. A sealing member 530 is provided around the piston 53 so that the piston 53 is in sliding and sealing contact with the inner surface of the outer casing 1.

The pressure release valve 6 is attached to the outer casing 1 adjacent to closed end 505 of the tubular connector 501, and includes a valve housing 60 with a pressure release hole 61, a valve plug 62 provided in the hole 61 and loaded with a spring 63, a push button 64 connected to the valve plug 62, and a sealing member 65.

An elongated scale member of substantially C-shaped cross-section is connected to the piston member 53 by means of an adjustment screw 532 and a locking screw 533. The adjustment screw member 532 is threadedly inserted into the piston 53 and extends axially into the scale member 54 with a head 5322 thereof. The locking screw member 533 extends radially into the scale member 54 through an axial opening 541 and threaded into the head 5322, thereby fixing the piston 53 to the scale member 54. The scale member 54 extends axially into the transparent inner casing 10 so that the graduation marks provided on the scale member 54 can be viewed from the window 10. The "zero" graduation of the scale member 54 is normally aligned with the indicating mark T as shown in FIG. 3, when no testing pressure is in the pressure gauge.

When the pressure gauge is attached to a tire, the pressure enters the outer casing 1 and pushes the piston member 53 against the action of the spring 52. The scale member 54 can move steadily in the inner casing since its movement can be guided properly by the inner casing 3 due to the particular configuration of the scale member 54. With the adjustment screw 532, the position of the scale member 54 relative to the indicating mark T can be adjusted in case of the fatigue failure of the spring 52, that is to say, when the "zero" graduation of the scale member 54 is not in alignment with the indicating mark T, it can be adjusted to coincide with the indicating mark T.

The pressure gauge also provides advantages in that the piston 53 is in sliding contact with the inner surface of the metallic outer casing which produces less friction than with the plastic transparent inner casing, and in that the pressure chamber is formed in the outer casing so that provisions for sealing the inner casing from the outer casing are not necessary.

With the invention thus explained, it is apparent that various modifications and variations can be made without departing from the present invention. It is therefore intended that the invention be limited only as indicated in the appended claims.

What I claim is:

1. A pressure gauge comprising:
   an elongated outer casing having a first end, an opposite second end, a first accommodating portion adjacent to said first end, a remaining second accommodating portion adjacent to said second end, and a window adjacent to said first accommodating portion,
   a chuck connected to said second end of said outer casing and having an air inlet;
   a check valve provided in said air inlet;
   a transparent inner casing fixed in said first accommodating portion;
   a piston member provided movably in said second accommodating portion and sealingly contacting the inner surface of said outer casing;
   an elongated scale member movably disposed in said inner casing and having one end connected to said piston member; and
   a spring member provided in said second accommodating portion and biasing said piston member away from said first accommodating portion.

2. A pressure gauge as claimed in claim 1, wherein said scale member is an elongated hollow member having a C-shaped cross-section.

3. A pressure gauge as claimed in claim 1, further comprising means for adjustably connecting said scale member and said piston member, said means including an adjustment screw attached to said piston member and said scale member.

* * * * *

UNITED STATES PATENT AND TRADEMARK OFFICE
CERTIFICATE OF CORRECTION

PATENT NO. : 4,966,035
DATED : October 30, 1990
INVENTOR(S) : Tien-Tsai HUANG It is certified that error appears in the above-identified patent and that said Letters Patent is hereby corrected as shown below:

Column 1, after line 1, but before line 2, insert
-- Field of the Invention --

Column 1, after line 5, but before line 6, insert
-- Description of Background Art --

Column 1, line 11, delete "applicant of this"

Column 1, line 12, change "application" to
-- inventor of the present invention --

Column 1, line 13, delete "has" (second occurrence)

Column 1, line 3, change "be fatigued" to -- fatigue --

Column 2, line 3, after "gauge" change "in" to -- of --

Column 3, line 7, before "fatigue" delete "the"

Signed and Sealed this

Twelfth Day of May, 1992

*Attest:*

DOUGLAS B. COMER

*Attesting Officer*     *Acting Commissioner of Patents and Trademarks*